Nov. 27, 1923.

W. F. HENDERSON

SPRING HITCH

Filed Dec. 4, 1922

1,475,230

Inventor
W. F. Henderson,

Eccleston & Eccleston
Attorneys

Patented Nov. 27, 1923.

1,475,230

UNITED STATES PATENT OFFICE.

WILLIAM F. HENDERSON, OF KEMPTON, INDIANA.

SPRING HITCH.

Application filed December 4, 1922. Serial No. 604,803.

*To all whom it may concern:*

Be it known that I, WILLIAM F. HENDERSON, a citizen of the United States, residing at Kempton, in the county of Tipton and State of Indiana, have invented certain new and useful Improvements in Spring Hitches, of which the following is a full, clear, and exact description.

My invention relates to a device for connecting a plow, cultivator, harrow or the like to a tractor, and has for its object to provide such a device of unitary formation which may readily be substituted for the connections now in use.

A further object of the invention is the provision of such a device having a spring therein for taking up shocks, thereby relieving not only the tractor, but also the tool or vehicle being drawn from strains due to stopping and starting and strains caused by the drawn vehicle hitting obstructions, etc.

A further object of the invention resides in the fact that the spring is normally under a slight compression and thereby aids in holding the parts in proper position.

Other objects and advantages of the invention will be apparent from the following description when taken in connection with the accompanying drawings, in which.

Figure 1:
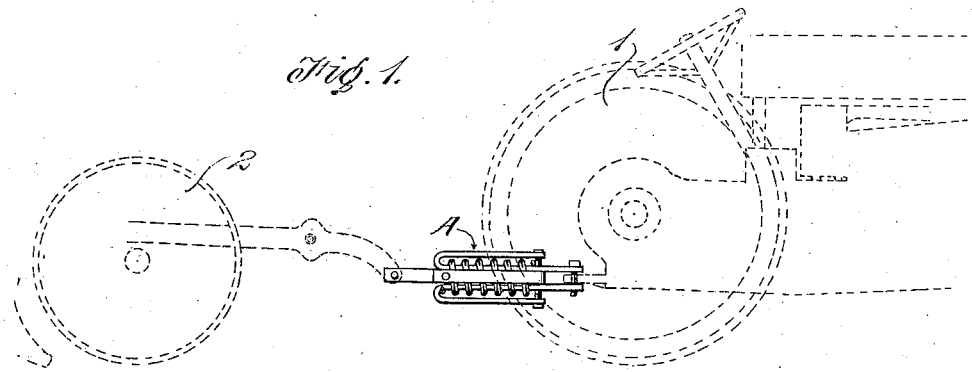
Figure 1 is a side elevation of the spring hitch connecting a tractor and plow.
Figure 2:
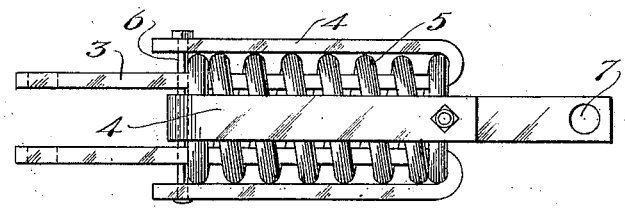
Figure 2 is a side elevation of the device detached from the tractor.
Figure 3:
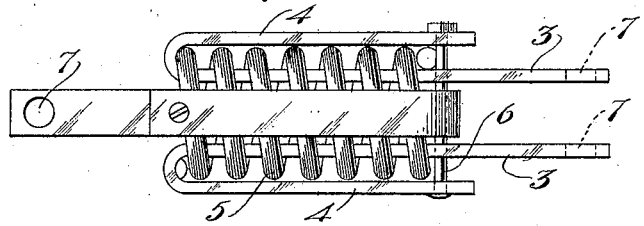
Figure 3 is a view similar to Figure 2 taken at an angle of 90° thereto.
Figure 4:
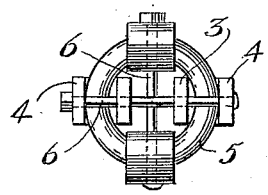
Figure 4 is an end elevation of the hitch.

Referring to the drawing more in detail, the numerals 1 and 2 indicate a tractor and plow, respectively, in dotted outline, which are connected by the novel spring hitch A. It is of paramount importance that some resilient means be employed in the connecting means between a tractor and the tool being drawn, in order that the shocks and jars incident to the work being performed may be absorbed thereby. To this end I have devised the spring hitch designated generally by the letter A. This device comprises two pairs of substantially U-shaped members, each member comprising a relatively long and short leg indicated by the numerals 3 and 4, respectively.

These pairs of U-shaped members are arranged in planes at right angles to each other and have the legs of each pair extending in opposite directions. As shown on the drawings, the shorter legs 4 are positioned on the outside of the device and the longer legs 3 toward the interior. A compression spring 5 surrounds each of the longer legs of the U-shaped members and is held normally under a slight compression by means of the bolts 6. One of the bolts 6 is attached to each end of the device by passing through apertures in the free ends of the legs 3 and 4. The spring, U-shaped members and the positions of the bolts are all so proportioned that the spring 5 is normally held under a slight compression, thereby preventing the parts from rattling and at the same time holding them in their proper relative positions. It should also be noted that, by reason of the bolts 6, the hitch is operable when backing the tractor and that the shock absorbing feature is retained, whether the tractor is moving forward or backward.

The legs 3 of each of the U-shaped members are provided with an aperture 7 by means of which the device is bolted to the tractor and plow.

From the foregoing description it will be seen that I have provided an exceedingly simple and inexpensive type of spring hitch which will readily absorb the shocks to which the tractor, etc., are subjected, and one which may be sold on the market as a unitary structure, and which may be quickly attached to the conventional tractor, plow and the like without modification in any way whatever.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A spring hitch for plows and the like, including two pairs of substantially U-shaped members, a bolt connecting the free ends of each pair of U-shaped members, and a spring interposed between said bolts and encircling the inner leg of each U-shaped member.

2. A spring hitch for plows and the like, including two pairs of substantially U- shaped members, said pairs being arranged in planes at right angles to each other, a bolt connecting the free ends of each pair of U-shaped members, and a spring interposed between said bolts and encircling the inner leg of each U-shaped member.

3. A spring hitch for plows and the like, including two pairs of substantially U-shaped members, the legs of each pair of members extending in opposite directions, said pairs of U-shaped members being arranged in planes at right angles to each other, a coil spring surrounding one of the legs of each U-shaped member and having its ends seated in the bases of the U-shaped members, and a bolt connecting the free ends of each pair of U-shaped members.

4. A spring hitch for plows and the like, including two pairs of substantially U-shaped members, a bolt connecting the free ends of each pair of U-shaped members, a spring interposed between said bolts, and encircling the inner leg of each U-shaped member, and means provided on each pair of members for connecting the same to a plow or tractor.

5. A spring hitch for plows and the like including two pairs of substantially U-shaped members, each pair of U-shaped members having their legs extending in opposite directions, a spring surrounding one leg of each of said members, and means normally holding said spring under compression.

WILLIAM F. HENDERSON.